US012049950B2

United States Patent
Hidaka et al.

(10) Patent No.: US 12,049,950 B2
(45) Date of Patent: Jul. 30, 2024

(54) LID COMPONENT

(71) Applicants: JATCO Ltd, Fuji (JP); NISSAN MOTOR CO., LTD., Yokohama (JP)

(72) Inventors: Moe Hidaka, Sagamihara (JP); Yasuhiro Yoshida, Isehara (JP); Toshiyuki Fujii, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/002,311

(22) PCT Filed: Jun. 2, 2021

(86) PCT No.: PCT/JP2021/021016
§ 371 (c)(1),
(2) Date: Dec. 19, 2022

(87) PCT Pub. No.: WO2022/009568
PCT Pub. Date: Jan. 13, 2022

(65) Prior Publication Data
US 2023/0349459 A1 Nov. 2, 2023

(30) Foreign Application Priority Data

Jul. 9, 2020 (JP) .................................. 2020-118332

(51) Int. Cl.
*F16H 57/02* (2012.01)
*F16H 57/031* (2012.01)
*F16H 61/00* (2006.01)
*F16H 57/029* (2012.01)

(52) U.S. Cl.
CPC ....... *F16H 57/031* (2013.01); *F16H 61/0006* (2013.01); *F16H 57/029* (2013.01)

(58) Field of Classification Search
CPC .. F16H 57/029; F16H 57/031; F16H 57/0436; F16H 61/0006
See application file for complete search history.

(56) References Cited

U.S. PATENT DOCUMENTS 11,859,714 B2 *   1/2024   Yukawa   .............. F16H 57/0436

FOREIGN PATENT DOCUMENTS

| CN | 114033846 | A | * | 2/2022 | |
| JP | 2016223452 | A | * | 12/2016 | .............. B60K 6/40 |
| JP | 2019-019887 | A | | 2/2019 | |
| JP | 2019-019888 | A | | 2/2019 | |
| JP | 2019173943 | A | * | 10/2019 | |
| WO | WO-2019/176329 | A1 | | 9/2019 | |

OTHER PUBLICATIONS

Machine translation of JP 2019-19887 A obtained on Jan. 8, 2024.*

* cited by examiner

*Primary Examiner* — Adam D Rogers
(74) *Attorney, Agent, or Firm* — Foley & Lardner LLP

(57) ABSTRACT

A lid component is arranged to face an electric oil pump. The lid component includes an accommodation groove that accommodates at least a part of the electric oil pump on a surface side from which a lid-side connector protrudes.

9 Claims, 7 Drawing Sheets

LID COMPONENT

TECHNICAL FIELD

The present invention relates to a lid component.

BACKGROUND ART

Patent Documents 1 and 2 disclose a structure of an apparatus related to power transmission in a vehicle, wherein a transmission controller (ATCU: Automatic Transmission Control Unit) is attached to a lid of an electric oil pump chamber.

PRIOR ART DOCUMENT

Patent Document

Patent Document 1: JP2019-19887A
Patent Document 2: JP2019-19888A

SUMMARY OF INVENTION

There is a need to provide a lid component that is included in an apparatus and that contributes to the layout of the apparatus. Alternatively, there is a need to provide an apparatus having such a lid component.

According to an aspect of the present invention, a lid component is arranged to face an electric oil pump. The lid component includes an accommodation groove that accommodates at least a part of the electric oil pump on a surface side from which a lid-side connector protrudes.

According to the aspect of the present invention, it is possible to provide a lid component that contributes to the layout of an apparatus. Alternatively, an apparatus including the lid component can be provided.

DESCRIPTION OF EMBODIMENTS

Hereinafter, a belt continuously variable transmission 1, which is an apparatus related to power transmission in a vehicle, will be described as an example of an apparatus having a lid component 4 according to the present embodiment.

Figure 1:
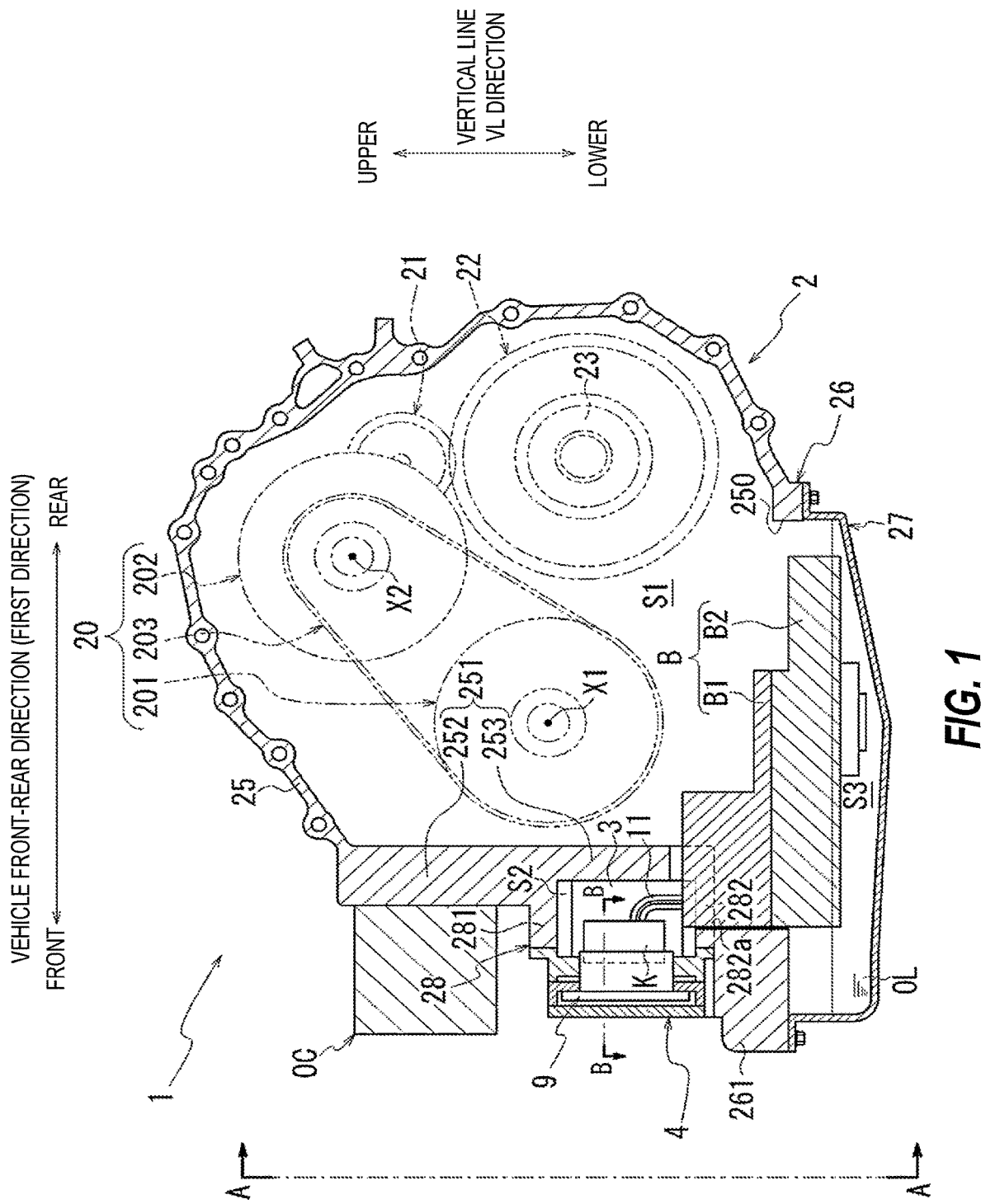
FIG. 1 is a schematic configuration diagram illustrating an arrangement of components of a continuously variable transmission in a transmission case.

FIG. 1 is a schematic configuration diagram illustrating an arrangement of components of the continuously variable transmission 1 in a transmission case 2. In FIG. 1, a variator 20, a gear train 21, a final gear 22, and a differential apparatus 23 are simply indicated by imaginary lines.

Figure 2:
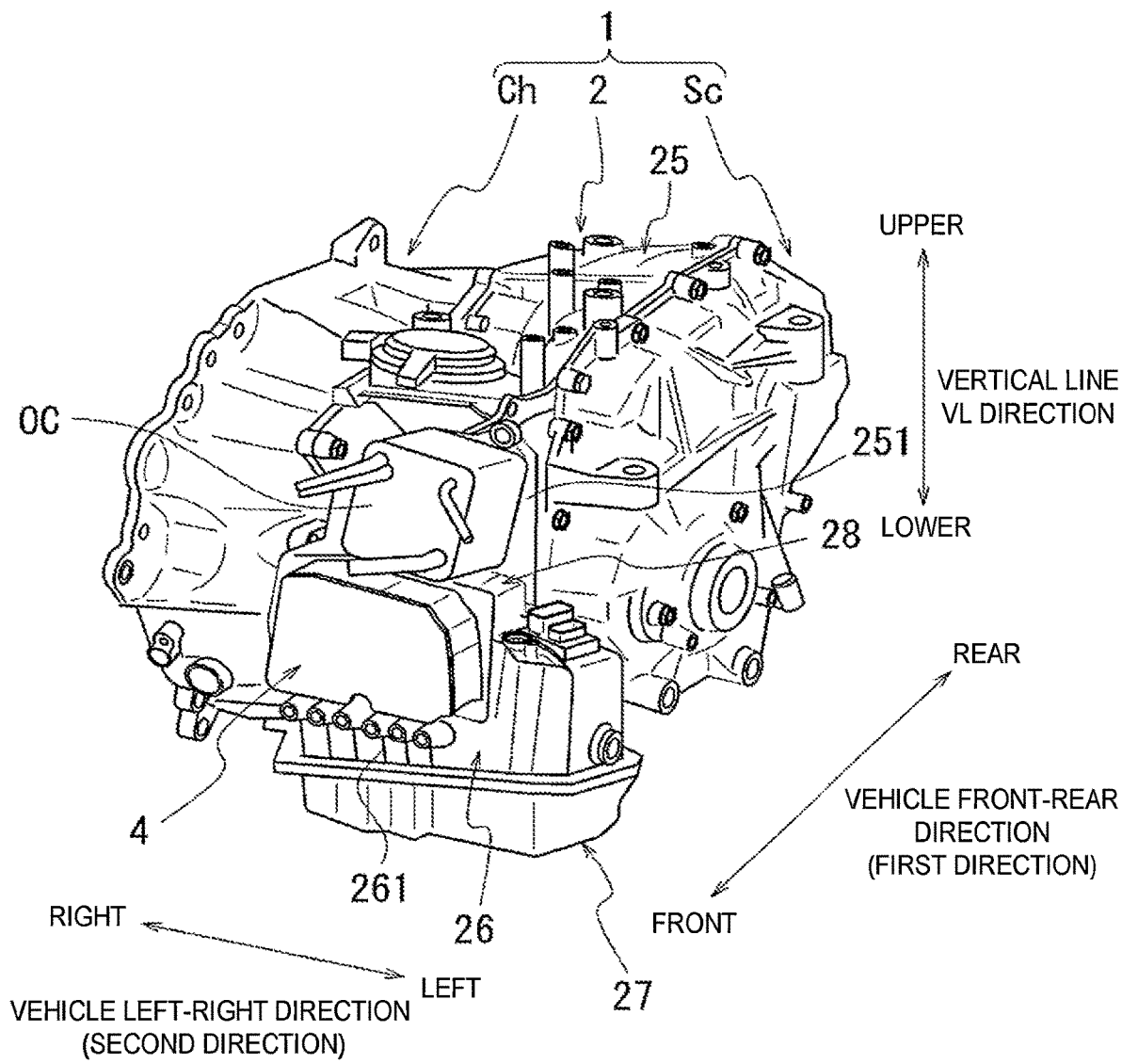
FIG. 2 is a diagram illustrating the transmission case.

FIG. 2 is a diagram illustrating the transmission case 2. FIG. 2 is a perspective view of the continuously variable transmission 1 viewed from an A-A direction in FIG. 1.

In the present description and the drawings, a vehicle front-rear direction (first direction), a vehicle left-right direction (second direction), and a vertical line VL direction mean directions viewed from a driver who rides on the vehicle. The vehicle front-rear direction, the vehicle left-right direction, and the vertical line VL direction intersect (are orthogonal to) each other.

As shown in FIG. 1, the variator 20 of the continuously variable transmission 1 includes a primary pulley 201, a secondary pulley 202, and a power transmission member 203 such as a belt.

The primary pulley 201 receives a rotational driving force from an unillustrated driving source and rotates about a rotation axis X1 (the axial center of the primary pulley 201). The secondary pulley 202 rotates around a rotation axis X2 (the axial center of the secondary pulley 202) parallel to the rotation axis X1.

The power transmission member 203 is wound around the outer periphery of the primary pulley 201 and the outer periphery of the secondary pulley 202. The rotational driving force input to the primary pulley 201 is transmitted to the secondary pulley 202 via the power transmission member 203.

In the variator 20, when the rotational driving force is transmitted from the primary pulley 201 to the secondary pulley 202, the winding radius of the power transmission member 203 on the primary pulley 201 and the winding radius of the power transmission member 203 on the secondary pulley 202 are changed. Thus, the rotational driving force input to the primary pulley 201 is speed changed and transmitted to the secondary pulley 202.

The speed ratio for speed changing the rotational driving force is determined according to the winding radii of the power transmission member 203 on the primary pulley 201 and the secondary pulley 202. The winding radii is determined by a transmission controller 9 based on the running state, etc. of the vehicle on which the continuously variable transmission 1 is mounted.

The rotational driving force transmitted to the secondary pulley 202 is finally transmitted to driving wheels (not shown) via the gear train 21, the final gear 22, and the differential apparatus 23.

An outer peripheral wall 25 of the transmission case 2 forms a first chamber S1, which accommodates the variator 20, the gear train 21, the final gear 22, and the differential apparatus 23, inside the transmission case 2.

As shown in FIG. 2, a side cover Sc is attached to the transmission case 2 from one side (the right side in the drawing), and a converter housing Ch is attached to the transmission case 2 from the other side (the left side in the drawing), with the transmission case 2 interposed therebetween.

The continuously variable transmission 1 is attached to the driving source (not shown) in a state in which an overlapping direction of the transmission case 2, the side cover Sc, and the converter housing Ch is along the vehicle left-right direction (vehicle width direction).

As shown in FIG. 1, the transmission case 2 has a peripheral wall portion 26 surrounding a lower opening 250 of the outer peripheral wall 25 of the transmission case 2.

An oil pan 27 is attached to the peripheral wall portion 26 of the transmission case 2 from below in the vertical line VL direction. The oil pan 27 covers the lower opening 250 of the outer peripheral wall 25 in a state of being fixed to the peripheral wall portion 26. The oil pan 27 forms a third chamber S3 serving as a storage space for a hydraulic oil OL (oil) in a lower portion of the transmission case 2.

A control valve unit B is arranged in the third chamber S3.

The control valve unit B is constituted by overlapping an upper valve B1 and a lower valve B2. A separate plate (not shown) is interposed between the upper valve B1 and the lower valve B2. Each of the upper valve B1 and the lower valve B2 has an oil passage (not shown) formed therein, and constitutes a hydraulic control circuit together with the separate plate.

The control valve unit B is accommodated in the third chamber S3 in a state in which an overlapping direction of the upper valve B1 and the lower valve B2 is along with the vertical line VL direction.

In the internal space of the transmission case 2, the upper side in the vertical line VL direction is the first chamber S1, and the lower side in the vertical line VL direction is the third chamber S3. Further, the volume of the first chamber S1 is sufficiently larger than the volume of the third chamber S3.

As shown in FIG. 1, a region on the vehicle front side (the left side in the drawing) of the outer peripheral wall 25 is a partition wall portion 251 that extends in the vertical line VL direction.

An oil cooler OC and the electric oil pump 3 are fixed to the partition wall portion 251. On the partition wall portion 251, the electric oil pump 3 is arranged closer to the oil pan 27 side (the lower side in the vertical line VL direction) than the oil cooler OC.

The partition wall portion 251 has a first wall 252 to which the oil cooler OC is attached and a second wall 253 to which the electric oil pump 3 is attached. The second wall 253 is located below the first wall 252 in the vertical line VL direction.

As shown in FIGS. 1 and 2, the peripheral wall portion 26 surrounding the lower opening 250 of the transmission case 2 is formed with a bulging region 261 on the vehicle front side. The bulging region 261 bulges further to the vehicle front side than the partition wall portion 251.

As shown in FIG. 1, a wall portion 28 surrounding the electric oil pump 3 is formed in a region between the bulging region 261 and the oil cooler OC in the vertical line VL direction. A space surrounded by the wall portion 28 is a second chamber S2 serving as an accommodation space for the electric oil pump 3. A lid component 4 for covering the opening of the second chamber S2 is attached to the wall portion 28.

Figure 3:
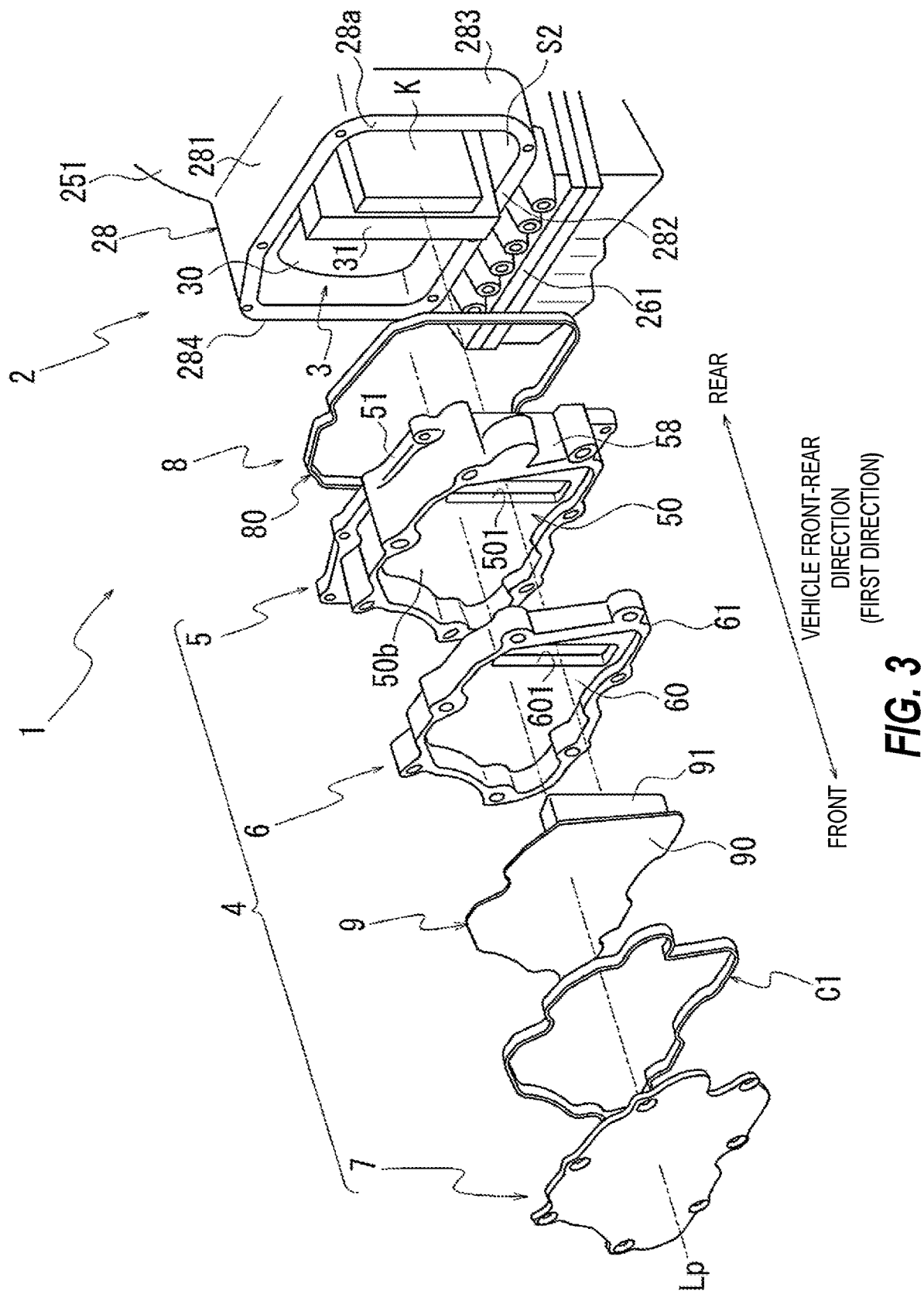
FIG. 3 is a diagram illustrating an arrangement of the transmission case and a lid component.

FIG. 3 is a diagram illustrating an arrangement of the transmission case 2 and the lid component 4. FIG. 3 is an exploded perspective view illustrating the lid component 4 separated from the wall portion 28 and illustrating the lid component 4 in an exploded manner.

Figure 4:
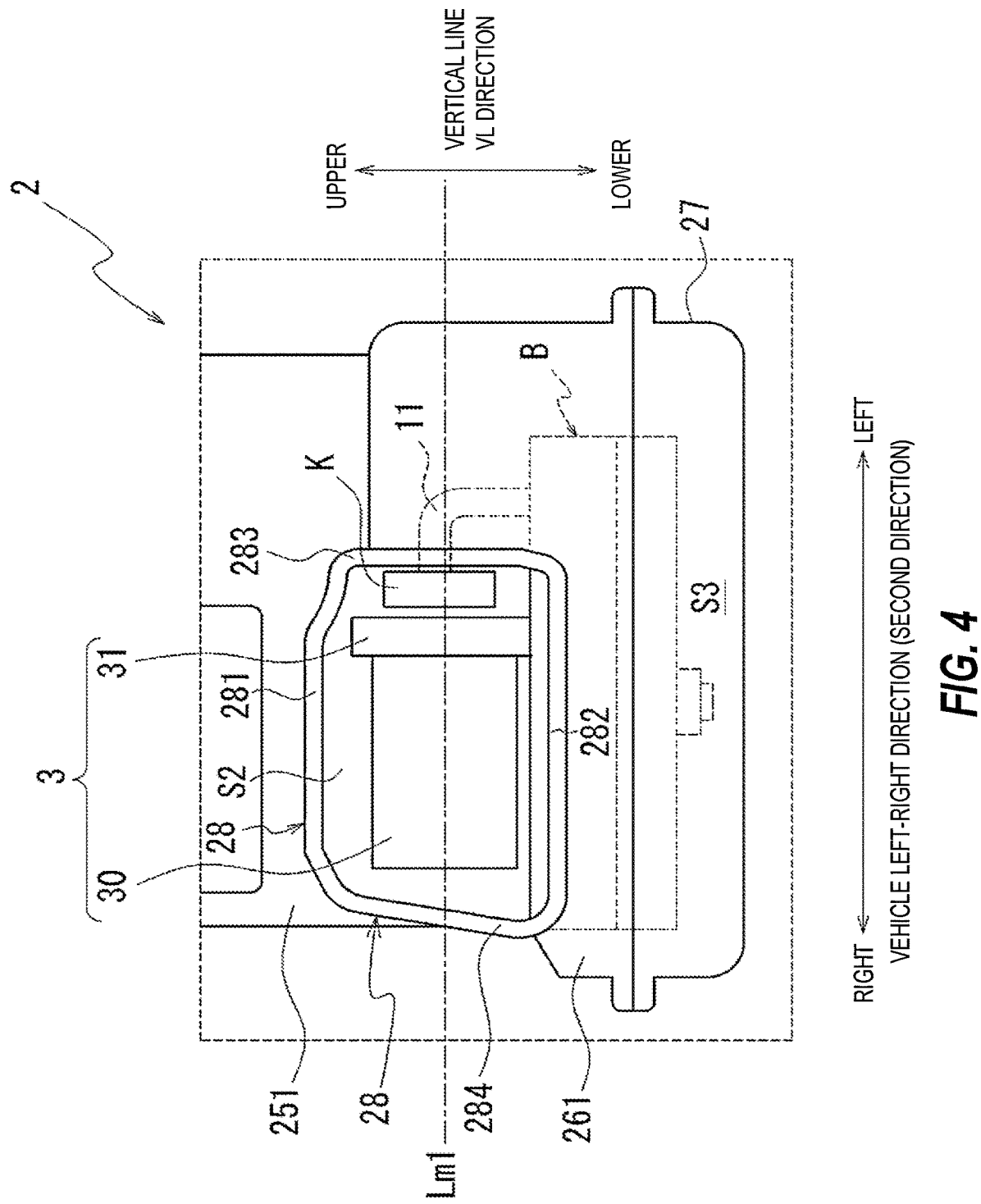
FIG. 4 is a diagram illustrating an arrangement of the transmission case and an electric oil pump.

FIG. 4 is a diagram illustrating an arrangement of the transmission case 2 and the electric oil pump 3. FIG. 4 is a diagram of the wall portion 28 viewed from the lid component 4 side in the vehicle front-rear direction of FIG. 3.

In FIG. 4, the control valve unit B and a wire harness 11 are indicated by broken lines. Further, the oil level of the hydraulic oil OL is omitted.

As illustrated in FIG. 4, the wall portion 28 is formed in a substantially rectangular annular shape of an upper wall portion 281, a lower wall portion 282, and side wall portions 283 and 284. The second chamber S2 is a space surrounded by the upper wall portion 281, the lower wall portion 282, and the side wall portions 283 and 284.

Specifically, the upper wall portion 281 extends toward the vehicle front side from a boundary portion between the first wall 252 and the second wall 253 of the partition wall portion 251 (see FIG. 1). The lower wall portion 282 is formed integrally with the bulging region 261. As shown in FIG. 4, the side wall portions 283 and 284 connect end portions of the upper wall portion 281 and the lower wall portion 282 to each other and extend in the vertical line VL direction.

A communication hole 282a that communicates the second chamber S2 and the third chamber S3 is formed in a region of the wall portion 28 located below on the oil pan 27 side (see FIG. 1). The communication hole 282a is formed to extend between the lower wall portion 282 and the second wall 253.

As shown in FIG. 4, the electric oil pump 3 is constituted of a pump unit 30 (rotary electric machine) that draws up the hydraulic oil OL stored in the third chamber S3 and supplies the hydraulic oil OL into the control valve unit B, and an inverter unit 31 that controls driving of the pump unit 30.

The electric oil pump 3 is accommodated in the second chamber S2 with the pump unit 30 and the inverter unit 31 being adjacent to each other in a direction of a straight line Lm1 along the vehicle left-right direction.

In the second chamber S2, a connector terminal K is arranged on the opposite side of the pump unit 30 with the inverter unit 31 interposed therebetween in the straight line Lm1 direction. The connector terminal K is fixed to the inverter unit 31 via an unillustrated bracket.

The connector terminal K is a connection terminal for electrically connecting the control valve unit B and the transmission controller 9 to be described later. The connector terminal K is attached to a front end of the wire harness 11 extending from the control valve unit B. The wire harness 11 connects the connector terminal K and the control valve unit B through the communication hole 282a (see FIG. 1). That is, the connector terminal K is an apparatus-side terminal provided in the continuously variable transmission 1 (apparatus).

As shown in FIG. 4, in the second chamber S2, the inverter unit 31 and the connector terminal K are arranged on the side wall portion 283 side in the straight line Lm1 direction.

As shown in FIG. 3, the front side of the second chamber S2 in the vehicle front-rear direction opens to the outside of the transmission case 2. In this state, the inverter unit 31 protrudes forward of the vehicle relative to a front end surface 28a of the wall portion 28.

The opening of the second chamber S2 is covered by the lid component 4 fixed to the front end surface 28a of the wall portion 28 on the vehicle front side (the left side in the drawing).

As shown in FIG. 3, the lid component 4 is constituted of an inner lid 5, a middle lid 6, and an outer lid 7. The inner lid 5, the middle lid 6, and the outer lid 7 are stacked in order along a direction of a straight line Lp extending in the vehicle front-rear direction.

[Lid Component 4]

Figure 5:
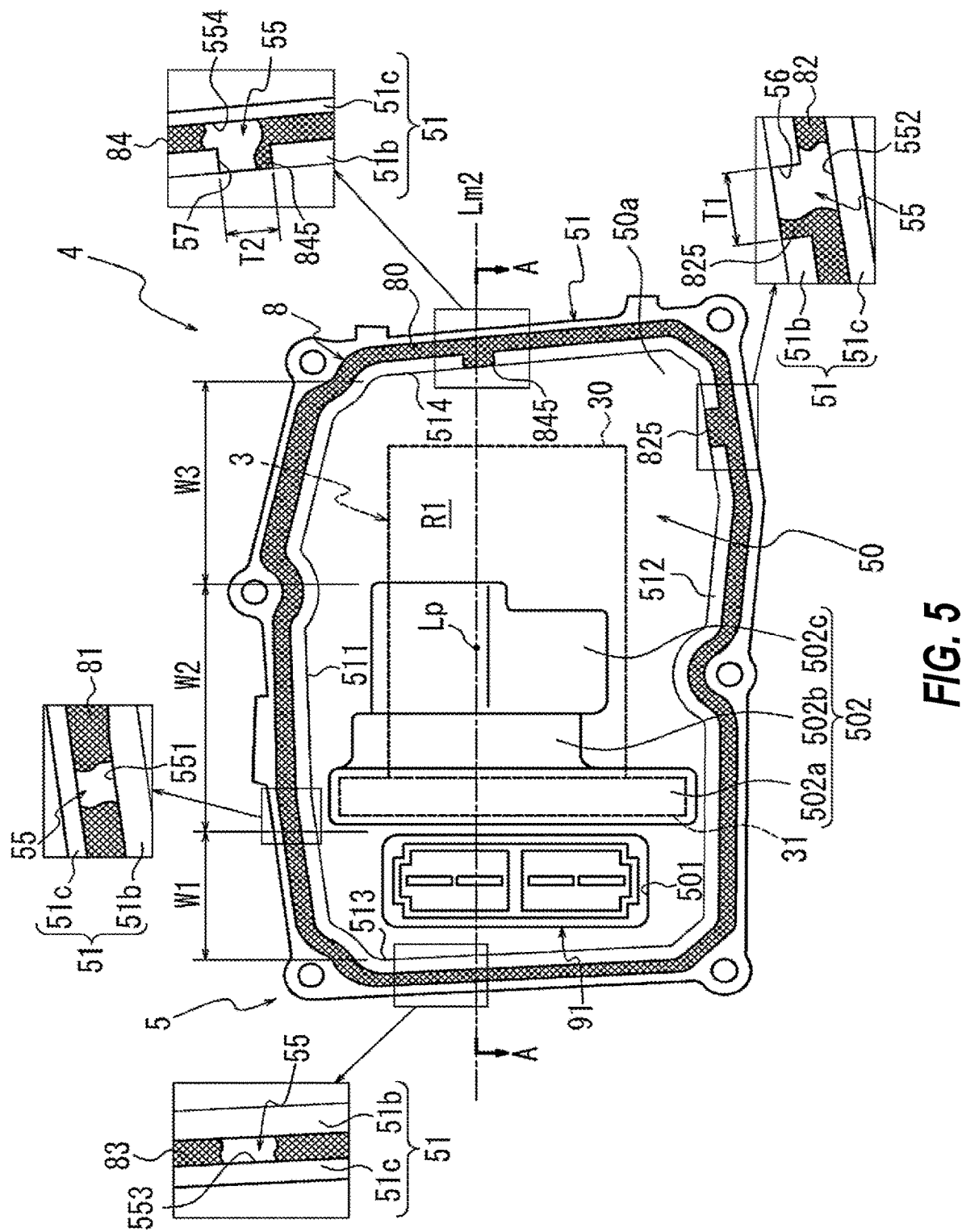
FIG. 5 is a diagram illustrating the lid component.

FIG. 5 is a diagram illustrating the inner lid 5 of the lid component 4. FIG. 5 is a diagram of the lid component 4 viewed from the transmission case 2 side in the vehicle front-rear direction of FIG. 3. In FIG. 5, a gasket 8 is cross-hatched for ease of understanding. Further, the electric oil pump 3 is indicated by broken lines.

Figure 6:
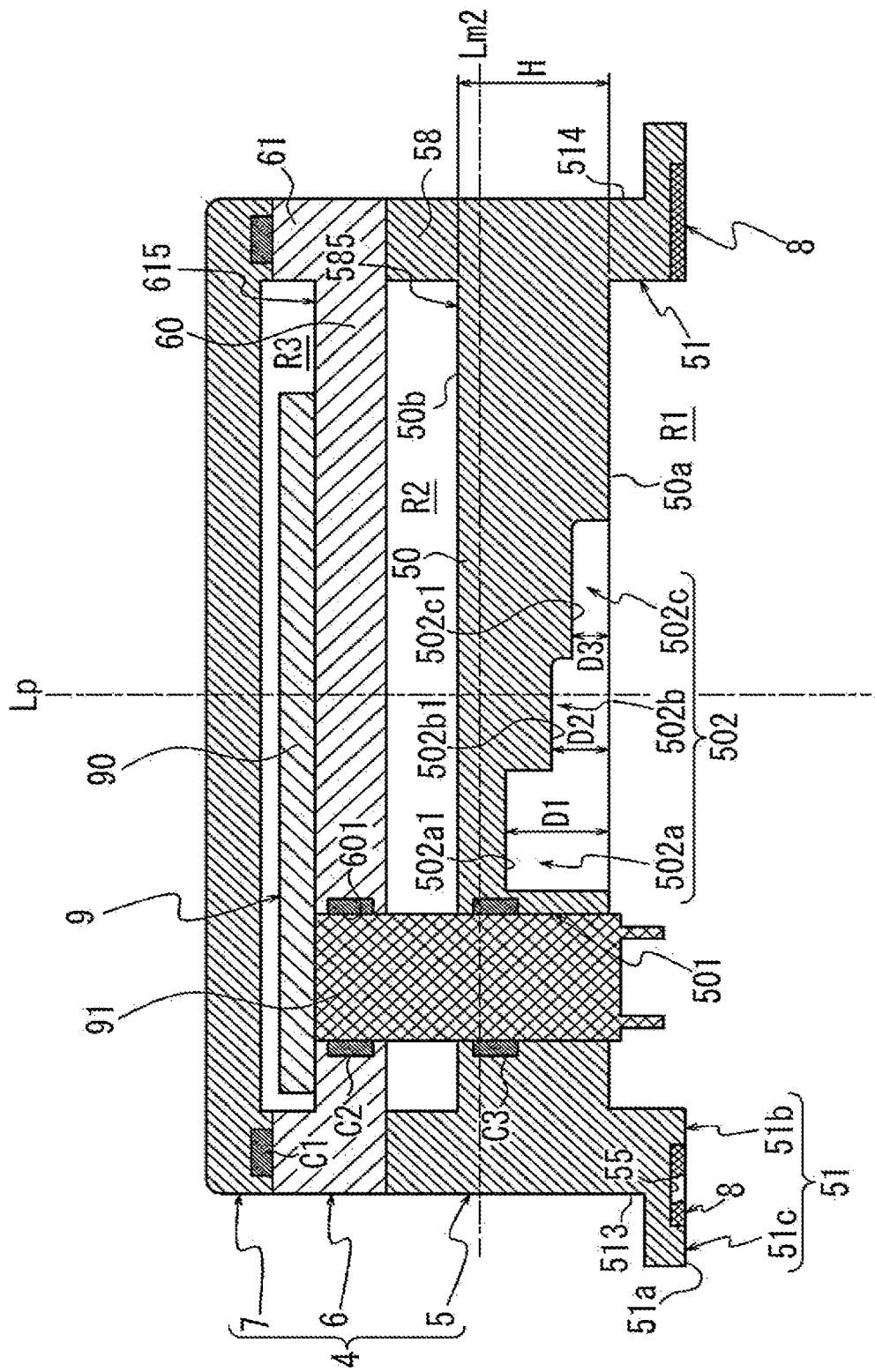
FIG. 6 is a diagram illustrating the lid component.

FIG. 6 is a diagram illustrating the lid component 4. FIG. 6 is a schematic cross-sectional view taken along a line A-A in FIG. 5.

As shown in FIG. 5, the inner lid 5 includes a plate bottom wall portion 50 (plate portion) having a substantially rectangular shape, and a peripheral wall portion 51 surrounding the entire outer peripheral edge on one surface 50a side of the bottom wall portion 50 in the thickness-wise direction.

The bottom wall portion 50 is sized to cover the opening of the second chamber S2 (see FIG. 4).

As shown in FIG. 6, the inner lid 5 covers the opening of the second chamber side S2 with the thickness-wise direction of the bottom wall portion 50 being along the straight line Lp direction. The bottom wall portion 50 of the inner lid 5 has a constant thickness H to ensure rigidity and strength.

As shown in FIG. 6, the bottom wall portion 50 is formed with a through hole 501 passing through the bottom wall portion 50 in the straight line Lp direction. The bottom wall portion 50 is formed with a recessed groove 502 that opens on one surface 50a of the bottom wall portion 50 (the lower side in FIG. 6) in the straight line Lp direction and is depressed in a direction that reduces the thickness H of the bottom wall portion 50.

As shown in FIG. 5, the through hole 501 and the recessed groove 502 are adjacent to each other in a direction of a straight line Lm2 along the longitudinal direction of the bottom wall portion 50. Further, the through hole 501 and the recessed groove 502 are arranged on one side of the bottom wall portion 50 in the straight line Lm2 direction (the left side in FIG. 5).

As shown in FIG. 5, when viewed from the straight line Lp direction, the through hole 501 has a shape that substantially matches an outer shape of a connector portion 91 of the transmission controller 9 to be described later.

As shown in FIG. 6, the recessed groove 502 is constituted of 3 grooves (a first recessed groove 502a, a second recessed groove 502b, and a third recessed groove 502c) having different depths. The first recessed groove 502a, the second recessed groove 502b, and the third recessed groove 502c are arranged along the straight line Lm2 direction, and the depth of each decreases in a stepwise manner as the distance from the through hole 501 increases. The depth of the recessed groove 502 is a distance from the one surface 50a to the bottom surface of the bottom wall portion 50 in the straight line Lp direction.

As shown in FIG. 5, the recessed groove 502 has the first recessed groove 502a adjacent to the through hole 501 in the straight line Lm2 direction. A depth of the first recessed groove 502a from the one surface 50a to a groove bottom 502a1 of the bottom wall portion 50 in the straight line Lp direction is D1 (see FIG. 6).

As shown in FIG. 5, when viewed from the straight line Lp direction, the first recessed groove 502a has a shape that substantially matches an outer shape (see the imaginary lines in FIG. 5) of the inverter unit 31 of the electric oil pump 3. The second recessed groove 502b and the third recessed groove 502c are formed at positions overlapping the pump unit 30 (see the imaginary lines in FIG. 5) of the electric oil pump 3 in the front-rear direction of the paper surface.

As shown in FIG. 5, the recessed groove 502 has a second recessed groove 502b, which is continuous with the first recessed groove 502a, on the opposite side of the through hole 501 across the first recessed groove 502a in the straight line Lm2 direction. A depth of the second recessed groove 502b from the one surface 50a to a groove bottom 502b1 of the bottom wall portion 50 in the straight line Lp direction is a depth D2 that is shallower than the depth D1 of the first recessed groove 501a (D2<D1, see FIG. 6).

As shown in FIG. 5, the recessed groove 502 has a third recessed groove 502c, which is continuous with the second recessed groove 502b, on the opposite side of the first recessed groove 502a across the second recessed groove 502b in the straight line Lm2 direction. A depth of the third recessed groove 502c from the one surface 50a to a groove bottom 502c1 of the bottom wall portion 50 in the straight line Lp direction is a depth D3 that is shallower than the depth D2 of the second recessed groove 501b (D3<D2, see FIG. 6).

As shown in FIG. 5, the peripheral wall portion 51 surrounding the entire outer peripheral edge of the bottom wall portion 50 has a substantially rectangular annular shape when viewed from the straight line Lp direction. Specifically, the peripheral wall portion 51 is constituted of long walls 511 and 512 extending in the straight line Lm2 direction and short walls 513 and 514 connecting the corresponding end portions of the long walls 511 and 512 to each other.

As shown in FIG. 6, the peripheral wall portion 51 extends in a direction away from the one surface 50a of the bottom wall portion 50 in the straight line Lp direction, and forms a flange shape in which a front end surface 51a side of the peripheral wall portion 51 in the straight line Lp direction protrudes outward.

As shown in FIG. 6, in the inner lid 5, a space R1 surrounded by the bottom wall portion 50 and the peripheral wall portion 51 is formed on the one surface 50a side of the bottom wall portion 50 in the straight line Lp direction.

As shown in FIG. 5, the space R1 of the inner lid 5 is divided into a first region W1 of the bottom wall portion 50 in which the through hole 501 is formed, a second region W2 of the bottom wall portion 50 in which the recessed groove 502 is formed, and a third region W3 of the bottom wall portion 50 in which the through hole 501 and the recessed groove 502 are not formed. The first region W1, the second region W2, and the third region W3 are arranged in this order from one side to the other side in the straight line Lm2 direction.

The first region W1 constitutes a connector arrangement region in which the connector portion 91 is provided. The second region W2 constitutes an accommodation groove arrangement region in which the recessed groove 502 is provided. The third region W3 constitutes a region other than the connector arrangement region and the accommodation groove arrangement region.

The first region W1 is surrounded by the long walls 511 and 512 and the short wall 513 of the peripheral wall portion 51. The second region W2 is sandwiched between the long walls 511 and 512 of the peripheral wall portion 51. The third region W3 is surrounded by the long walls 511 and 512 and the short wall 514 of the peripheral wall portion 51.

As shown in FIG. 6, a seal groove 55 opens on the front end surface 51a of the peripheral wall portion 51.

As shown in FIG. 5, the seal groove 55 is formed in a manner of surrounding the bottom wall portion 50 along the peripheral wall portion 51. The seal groove 55 has a substantially rectangular annular shape when viewed from the straight line Lp direction.

FIGS. 5 and 6 show a state in which a gasket 8 to be described later is fitted in the seal groove 55, and the gasket 8 is partially cut away to expose the seal groove 55.

The seal groove 55 is constituted of a first seal groove 551 formed in the long wall 511, a second seal groove 552 formed in the long wall 512, a third seal groove 553 formed in the short wall 513, and a fourth seal groove 554 formed in the short wall 514, as shown in each respective square frame of FIG. 5. The third seal groove 553 and the fourth seal groove 554 connect end portions of the first seal groove 551 and the second seal groove 552, respectively.

As shown in FIG. 5, the inner side of the peripheral wall portion 51 bounded by the seal groove 55 is an inner peripheral wall 51b, and the outer side of the peripheral wall portion 51 bounded by the seal groove 55 is an outer peripheral wall 51c. On the inner peripheral wall 51b, notches 56 and 57 are formed by partially cutting away the inner peripheral wall 51b.

The notch 56 is formed in the vicinity of the end portion of the long wall 512 on the short wall 514 side. The notch 56 allows the second seal groove 552 and the space R1 to communicate with each other in the third region W3.

The notch 57 is formed in the short wall 514. The notch 57 allows the fourth seal groove 554 and the space R1 to communicate with each other in the third region W3.

The notch width T1 of the notch 56 is larger than the notch width T2 of the notch 57 (T1>T2).

The notch width T2 of the notch 57 may be larger than the notch width T1 of the notch 56. What is necessary is that the notch width T1 of the notch 56 and the notch width T2 of the notch 57 are different from each other.

As shown in FIG. 5, the gasket 8 is fitted (accommodated) in the seal groove 55 as a seal member. The gasket 8 is formed by molding a resin material having oil resistance in accordance with the shape of the seal groove 55.

As shown in FIG. 5, the gasket 8 has a substantially rectangular annular base portion 80 which is fitted into the seal groove 55 over the entire periphery.

Specifically, as shown in each respective square frame of FIG. 5, the base portion 80 is constituted of a first base portion 81 and a second base portion 82, which are respectively fitted into the first seal groove 551 and the second seal groove 552, and a third base portion 83 and a fourth base portion 84, which are respectively fitted into the third seal groove 553 and the fourth seal groove 554.

Tabs 825 and 845 protrude from the inner periphery of the second base portion 82 and the inner periphery of the fourth base portion 84, respectively. The base portion 80 and the tabs 825 and 845 are integrally formed. The tabs 825 and 845 are fitted into the notches 56 and 57 of the above-described seal groove 55, respectively.

As shown in FIGS. 3 and 6, the outer peripheral edge on the other surface 50b side of the bottom wall portion 50 of the inner lid 5 in the straight line Lp direction is surrounded by the peripheral wall portion 58 of the inner lid 5 over the entire periphery. The peripheral wall portion 58 extends in a direction away from the other surface 50b of the bottom wall portion 50 in the straight line Lp direction.

As shown in FIG. 6, in the inner lid 5, a recessed portion 585 surrounded by the bottom wall portion 50 and the peripheral wall portion 58 is formed on the other surface 50b side of the bottom wall portion 50 in the straight line Lp direction. The recessed portion 585 opens on the side opposite to the space R1 in the straight line Lp direction.

The opening of the recessed portion 585 of the inner lid 5 is covered by the middle lid 6. In this state, a space R2 is formed between the recessed portion 585 and the middle lid 6. The inner lid 5 and the middle lid 6 are fixed by bolts (not shown), etc.

The middle lid 6 is constituted of a plate bottom wall portion 60 formed in a size to cover the opening of the recessed portion 585, and a peripheral wall portion 61 surrounding the entire periphery of the bottom wall portion 60.

The middle lid 6 covers the opening of the recessed portion 585 in a state in which the thickness-wise direction of the bottom wall portion 60 is along the straight line Lp direction. The bottom wall portion 60 is formed with a through hole 601 which passes through the bottom wall portion 60 in the straight line Lp direction. The through hole 601 is formed in a shape that substantially matches the outer shape of the connector portion 91 to be described later.

The peripheral wall portion 61 extends in a direction away from the inner lid 5 in the straight line Lp direction (upward in FIG. 6). The middle lid 6 is formed with a recessed portion 615 surrounded by the bottom wall portion 60 and the peripheral wall portion 61. The recessed portion 615 opens on the side opposite to the inner lid 5 in the straight line Lp direction.

The opening of the recessed portion 615 of the middle lid 6 is covered by the plate outer lid 7. In this state, a space R3 is formed between the recessed portion 615 and the outer lid 7. The middle lid 6 and the outer lid 7 are fixed by bolts (not shown), etc. A seal member C1 is interposed between the middle lid 6 and the outer lid 7. The outer lid 7 covers the opening of the recessed portion 615 in a state in which the thickness-wise direction of the outer lid 7 is along the straight line Lp direction.

As shown in FIG. 6, the transmission controller 9 is accommodated in the space R3. The transmission controller 9 includes a plate substrate 90 and the connector portion 91 electrically connected to a wiring (not shown) on the substrate 90.

The substrate 90 is fixed to the bottom wall portion 60 of the middle lid 6 by bolts (not shown), etc. in a state where the thickness-wise direction of the substrate 90 is along the straight line Lp direction.

The connector portion 91 extends from the substrate 90 toward the inner lid 5 in the straight line Lp direction. The connector portion 91 passes through the through hole 601 of the middle lid 6 and the through hole 501 of the inner lid 5 in the straight line Lp direction. In this state, the front end portion of the connector portion 91 is exposed in the space R1 of the inner lid 5. Seal members C2 and C3 are interposed respectively between the outer periphery of the connector portion 91 and the inner periphery of each of the through holes 601 and 501. That is, the connector portion 91 is a lid-side connector provided in the lid component 4.

The lid component 4 is attached to the transmission case 2 in a state where the inner lid 5 faces the second chamber S2 in the straight line Lp direction (see FIG. 3).

Hereinafter, an arrangement relation between the lid component 4 and the electric oil pump 3 in the state where the lid component 4 is attached to the transmission case 2 will be described.

Figure 7:
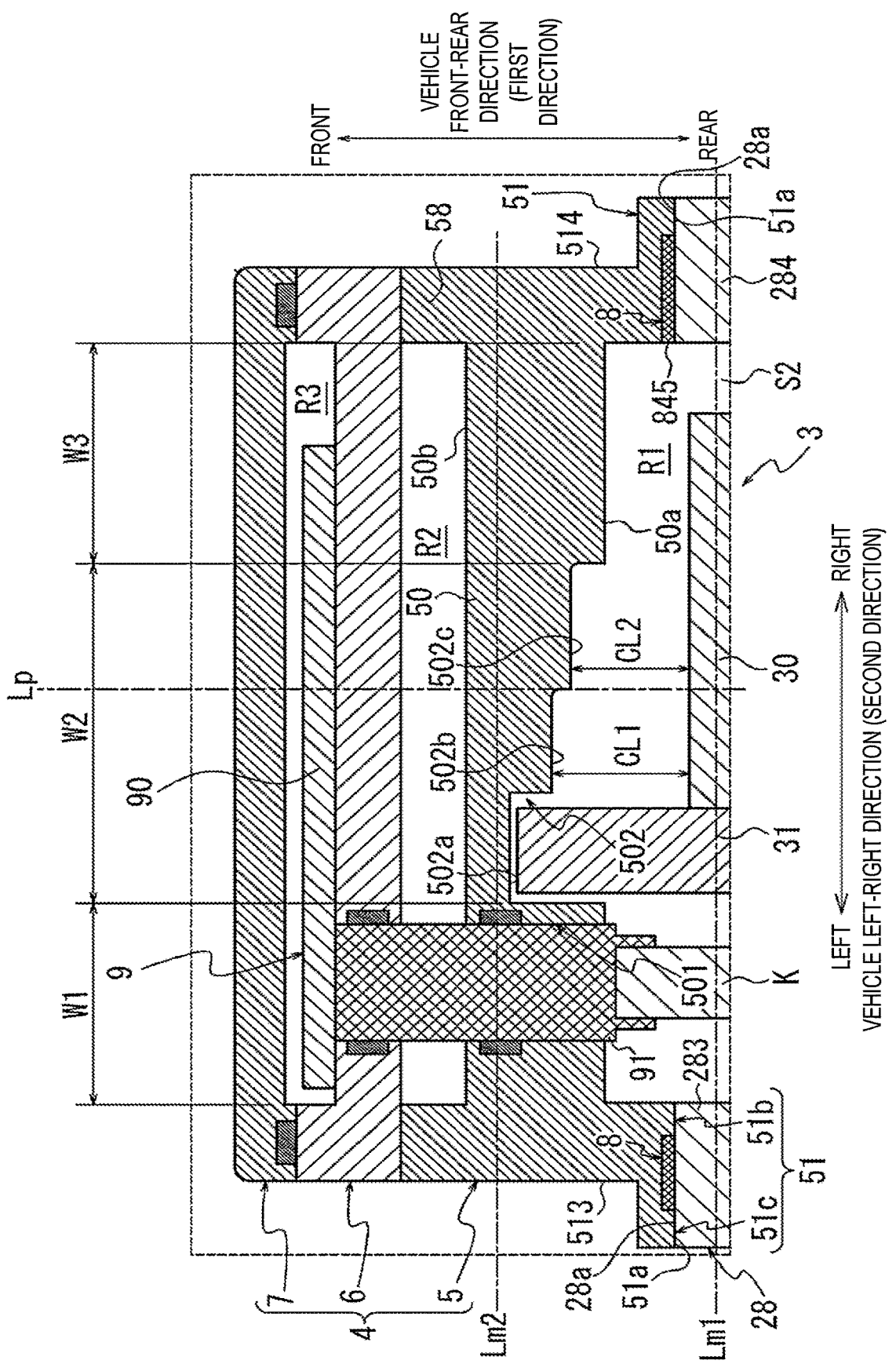
FIG. 7 is a diagram illustrating an arrangement of the lid component and the electric oil pump.

FIG. 7 is a diagram illustrating the arrangement of the lid component 4 and the electric oil pump 3. FIG. 7 is a schematic cross-sectional view taken along a line B-B in FIG. 1.

As shown in FIG. 7, the lid component 4 is fixed to the wall portion 28 by bolts (not shown), etc. in a state where the front end surface 51a of the peripheral wall portion 51 of the inner lid 5 overlaps the front end surface 28a of the wall portion 28 of the transmission case 2 in the straight line Lp direction. In this state, the space R1 of the inner lid 5 surrounded by the bottom wall portion 50 and the peripheral wall portion 51 communicates with the second chamber S2 surrounded by the wall portion 28 of the transmission case 2.

Specifically, the front end surface 51a (see FIG. 5) of the peripheral wall portion 51 of the inner lid 5 on the long wall 511 side overlaps the front end surface 28a (see FIG. 4) of the wall portion 28 of the transmission case 2 on the upper wall portion 281 side. The front end surface 51a (see FIG. 5) of the peripheral wall portion 51 on the long wall 512 side overlaps the front end surface 28a (see FIG. 4) of the wall portion 28 on the lower wall portion 282 side. The front end surface 51a (see FIG. 5) of the peripheral wall portion 51 on the short wall 513 side overlaps the front end surface 28a (see FIG. 4) of the wall portion 28 on the side wall portion 283 side. The front end surface 51a (see FIG. 5) of the peripheral wall portion 51 on the short wall 514 side overlaps the front end surface 28a (see FIG. 4) of the wall portion 28 on the side wall portion 284 side.

As shown in FIG. 7, the inner lid 5 is fixed to the wall portion 28 in a state where the straight line Lm2 along the longitudinal direction is along the direction of the straight line Lm1, which is along the vehicle left-right direction.

In this state, the one surface 50a of the bottom wall portion 50 of the inner lid 5 overlaps the connector terminal K and the electric oil pump 3 in the straight line Lp direction. Further, the connector portion 91 passing through the bottom wall portion 50 of the inner lid 5 overlaps the inverter unit 31 of the electric oil pump 3 in the straight line Lm1 direction.

In the first region W1 of the inner lid 5, the connector portion 91 of the transmission controller 9 is externally fitted to the connector terminal K from the straight line Lp direction. Thus, the connector portion 91 (transmission controller 9) and the connector terminal K (control valve unit B) are electrically connected to each other.

In the second region W2 of the inner lid 5, the recessed groove 502 of the inner lid 5 overlaps the electric oil pump 3 in the straight line Lp direction. Specifically, the first recessed groove 502a of the recessed groove 502 overlaps the inverter unit 31 which is at least a part of the electric oil pump 3, and the second recessed groove 502b and the third recessed groove 502c of the recessed groove 502 overlap the pump unit 30 which is at least a part of the electric oil pump 3.

Here, as shown in FIG. 7, the depth D1 (see FIG. 6) of the first recessed groove 502a of the recessed groove 502 is capable of accommodating the inverter unit 31 constituting a part of the electric oil pump 3 protruding from the wall portion 28 when the opening of the second chamber S2 is covered by the lid component 4. That is, the recessed groove 502 accommodates at least a part of the electric oil pump 3.

For example, in the case of using a lid component that does not include the recessed groove 502, when the size of the inverter unit 31 increases in the vehicle front-rear direction, it is necessary to extend the wall portion 28 of the transmission case 2 and the peripheral wall portion 51 of the inner lid 5 in the vehicle front-rear direction. Thus, the continuously variable transmission 1 becomes larger, leading to a poor layout of the continuously variable transmission 1 in the vehicle.

In the lid component 4 according to the present embodiment, even when the size of the inverter unit 31 is increased in the vehicle front-rear direction, the inverter unit 31 can be accommodated in the first recessed groove 502a of the recessed groove 502, and thus, it is not necessary to extend the wall portion 28 of the transmission case 2 or the peripheral wall portion 51 of the inner lid 5 in the vehicle front-rear direction.

Further, when the size of the inverter unit 31 is not changed, the lengths of the wall portion 28 of the transmission case 2 and the peripheral wall portion 51 of the inner lid 5 in the vehicle front-rear direction can be shortened. Thus, the lid component 4 contributes to the layout of the continuously variable transmission 1 in the vehicle.

As shown in FIG. 7, in a state where the inner lid 5 is attached to the wall portion 28, the space R2 (air layer) is interposed between the second chamber S2 and the transmission controller 9 (substrate 90) in the lid component 4.

When the continuously variable transmission 1 is driven, the oil (hydraulic oil OL) used for operation and lubrication of the variator 20 becomes high in temperature. Therefore, the temperature in the second chamber S2 accommodating the electric oil pump 3 becomes high due to heat generated by the electric oil pump 3.

In the present embodiment, the space R2 is interposed between the second chamber S2 and the space R3 accommodating the transmission controller 9. The air layer in the space R2 functions as a heat insulating layer.

Thus, heat transmission from the second chamber S2 side to the substrate 90 of the transmission controller 9 is suppressed. Note that a heat insulating material may be provided in the space R2.

In the second chamber S2, the temperature around the connecting portion between the inverter unit 31 and the pump unit 30 of the electric oil pump 3 becomes particularly high.

As shown in FIG. 7, the depths D2 and D3 (see FIG. 6) of the second recessed groove 502b and the third recessed groove 502c of the recessed groove 502 are such depths that when the opening of the second chamber S2 is covered by the lid component 4, gap portions CL1 and CL2 are formed between the lid component 4 and the pump unit 30 of the electric oil pump 3. The bottom wall portion 50 is moved away from the pump unit 30 by the presence of the gap portions CL1 and CL2. Therefore, it is possible to suppress the heat of the pump unit 30 from being transmitted to the inner lid 5. Therefore, it is possible to suppress the heat of the pump unit 30 from being finally transmitted to the substrate 90 of the transmission controller 9.

Here, the gasket 8 is interposed between the peripheral wall portion 51 of the inner lid 5 and the wall portion 28 (see FIG. 3). The gasket 8 needs to be fitted into the seal groove 55 of the inner lid 5 before the lid component 4 is attached to the transmission case 2.

In the present embodiment, the notches 56 and 57 are formed in the inner peripheral wall 51b of the peripheral wall portion 51 of the inner lid 5. The gasket 8 has the tabs 825 and 845 fitted into the notches 56 and 57 (see FIG. 5).

By fitting the tabs 825 and 845 into the notches 56 and 57, the occurrence of a so-called gasket displacement, in which the gasket 8 is displaced and out of position in the seal groove 55, is prevented. Thus, it is possible to suppress deterioration of the sealing performance of the lid component 4.

Gasket displacement can also be prevented by forming the notches 56 and 57 in the outer peripheral wall 51c of the peripheral wall portion 51. However, since a part of the tabs 825 and 845 is exposed to the external atmosphere, there is a concern that the gasket 8 may deteriorate due to the influence of salt damage, for example.

Therefore, it is more preferable to form the notches 56 and 57 in the inner peripheral wall 51b as in the present embodiment so that the tabs 825 and 845 are prevented from being exposed to the external atmosphere, since the deterioration of the gasket 8 can be suppressed thereby.

Here, as shown in FIG. 5, the notches 56 and 57 of the seal groove 55 are formed in the third region W3 of the inner peripheral wall 51b.

As shown in FIG. 7, the third region W3 is located at a position where the distance from the inverter unit 31 and the connector terminal K in the straight line Lm1 direction is greater than that of the first region W1 and the second region W2.

Therefore, when the gasket 8 is fitted into the seal groove 55, the tabs 825 and 845 are arranged in the third region W3.

Thus, even when the tabs 825 and 845 protrude from the notches 56 and 57 toward the space R1, the tabs 825 and 845 do not interfere with the inverter unit 31 or the connector terminal K.

In the present embodiment, the notch width T1 of the notch 56 and the notch width T2 of the notch 57 are different from each other (see FIG. 5). The tabs 825 and 845 of the gasket 8 are formed to have widths matching the widths T1 and T2 of the notches 56 and 57, respectively.

Accordingly, the assembling direction of the gasket 8 with respect to the seal groove 55 is limited to one direction. Therefore, it is possible to suppress a decrease in the sealing performance caused by a mistake in assembling the gasket (for example, upside down).

Note that the number of notches or tabs is not limited to 2. A notch or tab may be formed at 1 position within the third region W3. In addition, notches or tabs may be formed at 3 or more positions within the third region W3.

As described above, the lid component 4 according to the present embodiment has the following configuration.

(1) The lid component 4 is arranged to face the electric oil pump 3.

The inner lid 5 of the lid component 4 has the recessed groove 502 (accommodation groove) for accommodating at least a part of the electric oil pump 3 on the one surface 50a side of the bottom wall portion 50 from which the connector portion 91 (lid-side connector) of the transmission controller 9 protrudes.

For example, when the recessed groove 502 is not provided on the one surface 50a of the bottom wall portion 50, the wall portion 28 of the transmission case 2 and the peripheral wall portion 51 of the inner lid 5 need to be extended in the vehicle front-rear direction if at least a part of the electric oil pump 3 (for example, the inverter unit 31) is increased in size in the vehicle front-rear direction. Thus, the continuously variable transmission 1 becomes larger, leading to a poor layout of the continuously variable transmission 1 in the vehicle.

With the above-described configuration, the electric oil pump 3 is arranged on the one surface 50a side of the bottom wall portion 50, and thus, at least a part of the electric oil pump 3 (for example, the inverter unit 31, etc.) and the connector portion 91 are arranged to overlap each other in the straight line Lm1 direction.

Therefore, even when the size of the inverter unit 31 is increased in the vehicle front-rear direction, the inverter unit 31 can be accommodated in the recessed groove 502, and thus, it is not necessary to extend the wall portion 28 of the transmission case 2 or the peripheral wall portion 51 of the inner lid 5 in the vehicle front-rear direction.

Further, when the size of the inverter unit 31 is not changed, the lengths of the wall portion 28 of the transmission case 2 and the peripheral wall portion 51 of the inner lid 5 in the vehicle front-rear direction can be shortened.

Therefore, the lid component 4 can contribute to the layout of the continuously variable transmission 1 in the vehicle.

The lid component 4 according to the present embodiment has the following configuration.

(2) In the lid component 4, the substrate 90 (controller) of the transmission controller 9 connected to the connector portion 91 is disposed on the other surface 50b side (the side opposite to the surface from which the lid-side connector protrudes) of the bottom wall portion 50 of the inner lid 5.

Here, the bottom wall portion 50 of the inner lid 5 has a constant thickness H in order to ensure rigidity and strength.

According to the above-described configuration, it is possible to increase a usable space for forming the recessed groove 502 on the one surface 50a side of the bottom wall portion 50 using the depth of the bottom wall portion 50, etc. Therefore, the degree of freedom in design is improved.

The lid component 4 according to the present embodiment has the following configuration.

(3) In the lid component 4, the space R2 (clearance) is interposed between the transmission controller 9 and the bottom wall portion 50 (plate portion) of the inner lid 5 provided with the recessed groove 502.

The electric oil pump 3 (inverter, motor, etc.) is a heat-generating component.

In the above-described configuration, the air layer (clearance) is interposed between the transmission controller 9 and the bottom wall portion 50 of the inner lid 5, so that the heat of the electric oil pump 3 can be suppressed from being transmitted to the transmission controller 9. As a result, the temperature rise of the transmission controller 9 can be suppressed.

The lid component 4 according to the present embodiment has the following configuration.

(4) The inner lid 5 of the lid component 4 has the seal groove 55 sandwiched between the outer peripheral wall 51c and the inner peripheral wall 51b.

The lid component 4 has the gasket 8 (seal) which is accommodated in the seal groove 55.

The lid component 4 has the notch 57 (notch portion), into which the tab 845 provided on the gasket 8 is fitted, in at least one of the outer peripheral wall 51c and the inner peripheral wall 51b.

With such a configuration, the gasket 8 is provided with the tab 845, and the tab 845 can be fitted into the notch 57. Therefore, it is possible to prevent the position of the gasket 8 from being displaced and the sealing performance from being deteriorated.

Note that the shape of the gasket 8 is not limited, and the configuration is particularly effective when the shape of the gasket 8 is asymmetric (when viewed from the front, the shape is asymmetric in at least one of the left-right direction and the up-down direction).

The lid component 4 according to the present embodiment has the following configuration.

(5) The notch 57 of the inner lid 5 of the lid component 4 is formed in the inner peripheral wall 51b.

The notch 57 is arranged to avoid the second region W2 (accommodation groove arrangement region) in which the recessed groove 502 is formed.

With such a configuration, the tab 845 fitted into the notch 57 is not exposed to the external atmosphere, and thus, it is possible to suppress deterioration of the gasket 8 due to exposure to the external atmosphere. The configuration is particularly advantageous against salt damage.

When the notch 57 is provided on the inner peripheral wall 51b side, there is a possibility that the tab 845 and a component on the inner peripheral side interfere with each other, however, since the notch 57 is arranged to avoid the second region W2, it is possible to avoid interference between the tab 845 and at least a part of the electric oil pump 3 (particularly, the inverter unit 31).

The lid component 4 according to the present embodiment has the following configuration.

(6) The inner lid 5 of the lid component 4 includes the first region W1 (connector arrangement region) in which the connector portion 91 is arranged.

The notch 57 is arranged in the third region W3 that avoids the second region W2 (accommodation groove arrangement region) and the first region W1 (connector arrangement region) in the inner lid 5.

With such a configuration, it is possible to avoid interference between the tab 845 and at least a part of the electric oil pump 3 (particularly, an inverter, etc.) and to avoid interference between the connector portion 91 and the tab 845.

The lid component 4 according to the present embodiment has the following configuration.

(7) The inner lid 5 of the lid component 4 is formed with the another notch 56 (notch portion) having the notch width T1 which is wider than the notch width T2 of the notch 57.

The gasket 8 has the another tab 825 that is fitted in the another notch 56 and has the width T1 which is wider than the width T2 of the tab 845.

With such a configuration, it is possible to suppress assembling errors of the front and back surfaces of the gasket 8 and to suppress the deterioration of the sealing performance due to assembling errors.

The width T2 of the notch 57 and the tab 845 may be larger than the width T1 of the notch 56 and the tab 825. What is necessary is that the notch width T1 of the notch 56 and the notch width T2 of the notch 57 are different from each other.

The continuously variable transmission 1 (apparatus) including the lid component 4 according to the present embodiment has the following configuration.

(8) The continuously variable transmission 1 includes the lid component 4 and the electric oil pump 3.

In the continuously variable transmission 1, the electric oil pump 3 and the lid component 4 overlap each other in the direction of the straight line Lp along the vehicle front-rear direction (first direction).

In the continuously variable transmission 1, the electric oil pump 3 and the connector portion 91 overlap each other in the direction of the straight line Lm1 along the vehicle left-right direction (second direction) intersecting with the vehicle front-rear direction.

With such a configuration, at least a part of the electric oil pump (particularly, the inverter unit 31, etc.) can be arranged in the first recessed groove 502*a* (stepped portion) of the recessed groove 502 adjacent to the connector portion 91. Accordingly, even when the size of the inverter unit 31 is increased in the vehicle front-rear direction, by accommodating the inverter unit 31 in the first recessed groove 502*a*, it is not necessary to extend the wall portion 28 of the transmission case 2 and the peripheral wall portion 51 of the inner lid 5 in the vehicle front-rear direction. Therefore, the layout of the continuously variable transmission 1 can be improved.

The continuously variable transmission 1 (apparatus) including the lid component 4 according to the present embodiment has the following configuration.

(9) The continuously variable transmission 1 includes the connector terminal K (apparatus-side connector) connected to the connector portion 91.

The electric oil pump 3 includes the inverter unit 31 (inverter) and the pump unit 30 (rotary electric machine) connected to the inverter unit 31.

In the continuously variable transmission 1, the inverter unit 31 is arranged between the pump unit 30 and the connector terminal K in the straight line Lm1 direction.

With such a configuration, the pump unit 30 driven by the inverter unit 31 is arranged on the side opposite to the connector portion 91 and the connector terminal K with the inverter unit 31 sandwiched therebetween. As a result, it is possible to suppress the occurrence of dead spaces in the second chamber S2, and thus, it is possible to improve the layout of the continuously variable transmission 1.

In the present embodiment, the first direction is the vehicle front-rear direction, and the second direction is the vehicle left-right direction, however, the first direction and the second direction are not limited thereto.

Although an aspect of the present invention has been described above, the present invention is not limited to the aspect shown in the present embodiment. Modifications can be made as appropriate within the scope of the technical idea of the invention.

DESCRIPTION OF REFERENCE SIGNS

1 Continuously variable transmission (apparatus)
3 Electric oil pump
30 Pump unit (rotary electric machine)
31 Inverter unit (inverter)
4 Lid component
50 Bottom wall portion (plate portion)
50*a* One surface (the surface from which the lid-side connector protrudes)
50*b* Other surface (the side opposite to the surface from which the lid-side connector protrudes)
502 Recessed groove (accommodation groove)
51*b* Inner peripheral wall
51*c* Outer peripheral wall
55 Seal groove
56 Notch (notch portion)
57 Notch (notch portion)
8 Gasket (seal)
825 Tab
845 Tab
9 Transmission controller
90 Substrate (controller)
91 Connector portion (lid-side connector)
K Connector terminal (apparatus-side connector)
Lp Straight line (first direction)
Lm1 Straight line (second direction)
R2 Space (clearance)
W1 First region (connector arrangement region)
W2 Second region (accommodation groove arrangement region)
W3 Third region The present application claims a priority of Japanese Patent Application No. 2020-118332 filed with the Japan Patent Office on Jul. 9, 2020, all the contents of which are hereby incorporated by reference.

The invention claimed is:

1. A lid component arranged to face an electric oil pump, the lid component comprising:
a plate portion, and
a peripheral wall portion surrounding an outer peripheral edge of the plate portion, wherein
an accommodation groove that accommodates at least a part of the electric oil pump is formed on a surface of the plate portion from which a lid-side connector protrudes.

2. The lid component according to claim 1, wherein
a controller connected to the lid-side connector is arranged on a side opposite to the surface from which the lid-side connector protrudes.

3. The lid component according to claim 2, wherein
a clearance is interposed between the controller and the plate portion.

4. The lid component according to claim 1, further comprising:
- a seal groove sandwiched between an outer peripheral wall and an inner peripheral wall;
- a seal accommodated in the seal groove; and
- a notch portion into which a tab provided on the seal is fitted in at least one of the outer peripheral wall and the inner peripheral wall.

5. The lid component according to claim 4, wherein the notch portion is provided in the inner peripheral wall, and the notch portion is arranged to avoid an accommodation groove arrangement region where the accommodation groove is arranged.

6. The lid component according to claim 5, further comprising:
- a connector arrangement region where the lid-side connector is arranged, wherein
- the notch portion is arranged to avoid the accommodation groove arrangement region and the connector arrangement region.

7. The lid component according to claim 4, further comprising:
- another notch portion that is wider than the notch portion; and
- another tab that is fitted into the another notch portion and is wider than the tab.

8. An apparatus comprising: the lid component according to claim 1; and the electric oil pump, wherein
- the electric oil pump and the lid component overlap each other in a first direction, and
- the electric oil pump and the lid-side connector overlap each other in a second direction intersecting the first direction.

9. The apparatus according to claim 8, further comprising:
- an apparatus-side connector connected to the lid-side connector, wherein
- the electric oil pump includes an inverter and a rotary electric machine connected to the inverter, and
- the inverter is arranged between the rotary electric machine and the apparatus-side connector in the second direction.

* * * * *